United States Patent
Watts

[11] 3,902,133
[45] Aug. 26, 1975

[54] MONOLITHIC SOURCE FOR INTEGRATED OPTICS

[75] Inventor: Roderick Kent Watts, Dallas, Tex.

[73] Assignee: Texas Instruments, Incorporated, Dallas, Tex.

[22] Filed: Sept. 24, 1973

[21] Appl. No.: 400,072

[52] U.S. Cl.......... 331/94.5 H; 350/96 WG; 357/18
[51] Int. Cl............................................... H01s 3/00
[58] Field of Search............ 331/94.5 H; 317/235 N; 350/96 WG, 96 C; 357/18

[56] References Cited
UNITED STATES PATENTS

| | | | |
|---|---|---|---|
| 3,340,479 | 9/1967 | Ashkin | 331/94.5 |
| 3,351,410 | 11/1967 | Ashkin | 350/161 |
| 3,790,902 | 2/1974 | Miller | 331/94.5 H |

OTHER PUBLICATIONS

Kressel et al.: "Large–Optical–Cavity(AlGa) Ar–GaAs Heterojunction Laser Diode: Threshold and Efficiency," Journal of Applied Physics, Vol. 43, pp. 561–567, Feb., 1972.
Tracy et al.: "Three–dimensional Light Guides in Single-Crystal GaAs–Al$_x$Ga$_{1-x}$ As," Applied Physics Letters, Vol. 22, pp. 511–512, May 15, 1973.

*Primary Examiner*—Edward S. Bauer
*Attorney, Agent, or Firm*—Harold Levine; James T. Comfort; William E. Hiller

[57] ABSTRACT

The disclosure relates to a semiconductor diode laser and a thin film optical waveguide, wherein the output of the laser is coupled into the waveguide in a monolithic device structure. A transfer of power from the laser to the waveguide is achieved through an evanescent field coupling. To accomplish this, a large optical cavity injection laser including internal layers forming the optical cavity, to which radiation is confined because of index of refraction discontinuities, is provided as a mesa on a substrate wherein the substrate is made of n-type gallium arsenide. Two layers of n-type aluminum gallium arsenide are formed on the substrate followed by an n-type aluminum gallium arsenide layer included in the mesa which forms the laser structure. The uppermost n-type aluminum gallium arsenide layer on the substrate is the waveguide and has a lower aluminum to gallium ratio than the aluminum gallium arsenide layers respectively included in the substrate and the mesa laser structure on opposite sides thereof. An evanescent field coupling exists between the lower layer of the mesa laser structure and the waveguide layer of the substrate, the strength of which is controlled by the thickness of the n-type aluminum gallium arsenide layer in the mesa laser structure. The waveguide is transparent to the gallium arsenide laser radiation because of the larger band gap of the material thereof. In a typical situation, using 300 microns as a cavity length and other typical laser parameters, about 10 percent of the laser power is coupled into the waveguide for a thickness of the n-type aluminum gallium arsenide lower layer of the mesa laser structure of one micron. The laser cavity is formed by a further n-type gallium arsenide layer over which is a p-type gallium arsenide layer. A p-type aluminum gallium arsenide layer is over the p-type gallium arsenide layer and a further p-type gallium arsenide layer is above the p-type aluminum gallium arsenide layer to complete the mesa structure. The facets on the end faces of the laser are parallel and preferably covered with a highly reflecting non-conducting coating in the case of a transmitter where the laser is an oscillator. In the case of a repeater, where the laser is an amplifier, the end faces should have very low reflectivity. In this case they need not even be parallel.

5 Claims, 5 Drawing Figures

3,902,133

MONOLITHIC SOURCE FOR INTEGRATED OPTICS

This invention relates to a monolithic structure containing a laser and a waveguide coupled thereto, and more specifically to the evanescent field coupling of a thin film laser to a passive waveguide in a monolithic structure.

The ability to couple light from a laser into a waveguide for various purposes, such as optical transmission, has been attempted in the prior art. One such prior art attempt has been to couple a laser beam into a waveguide through a prism coupler. A second attempt has been to couple laser light through a grating into a waveguide. The literature also discusses the possibility of placing a laser directly into a waveguide. None of these attempts appear very practical. With the increased use of integrated circuitry and other miniaturized devices, it would be highly desirable to provide an optical transmitter or repeater wherein a laser and a waveguide can be coupled together in a monolithic structure, thereby providing miniaturization over prior art devices. Such devices would find great utility in the art due to the large transmission bandwidths available in the light frequency range as compared with the presently used transmission frequencies for transmitting information.

In accordance with the present invention, there is provided a system whereby a laser and a waveguide are coupled using an evanescent field, all within a monolithic structure. Briefly, this is accomplished by forming a large optical cavity injection laser as a mesa structure over a semiconductor waveguide. The waveguide is formed starting with an n-type gallium arsenide substrate on which are grown by liquid phase epitaxy a first layer of n-type gallium aluminum arsenide, and, on top of that, a second layer of n-type gallium aluminum arsenide. The second layer has a lower aluminum to gallium ratio than does the first and therefore has a higher refractive index. A mesa structure is now formed having five layers, the lowermost layer positioned on top of the second layer of gallium aluminum arsenide being a third layer of n-type gallium aluminum arsenide with substantially the same aluminum to gallium ratio as the first layer previously discussed. Over this layer of gallium aluminum arsenide are consecutively formed a layer of n-type gallium arsenide over which is a layer of p-type gallium arsenide. These two layers of gallium arsenide form a p-n junction and also form the laser cavity. A further layer of p-type gallium aluminum arsenide is formed as the top layer for the purpose of providing a proper substrate on which electrical contacts can be deposited. The index of refraction of the layers on each side of the p-n junction is higher than the layers below the laser cavity and a p-type aluminum gallium arsenide layer on top of the laser cavity. The opposite faces of the mesa structure are grown along crystallographic planes to provide flat highly mirrored surfaces which are parallel to each other. The faces can be covered with a highly reflective non-conducting coating in the case of the transmitter where the laser is an oscillator. A second electrode is formed beneath the n-type gallium arsenide substrate at the bottom, or, alternatively, on opposite sides of the mesa structure. The laser is caused to lase by applying an appropriate voltage across the pair of terminals. The discussion of this function is set forth in an article of Butler and Kressel, Journal of Applied Physics, Vol. 43, 1972, page 3403. In operation there is a coupling between the fields of the waveguide and the laser because the fields of the two overlap to some extent. Power can therefore be transferred from the laser to the waveguide and back if desired if the propagation constants, $\beta$, in the direction along the axis of both the waveguides are equal (Z axis of FIG. 1). This is accomplished by proper dimensioning and positioning of the above noted elements.

It is therefore an object of this invention to provide a monolithic structure containing a waveguide and a laser coupled together.

It is a further object of this invention to provide an optical transmitter or amplifier system containing a monolithic structure having a laser and a waveguide coupled thereto.

It is a yet further object of this invention to provide a monolithic structure including a gallium arsenide laser structure on an aluminum gallium arsenide substrate waveguide structure.

The above objects and still further objects of the invention will immediately become apparent to those skilled in the art after consideration of the following preferred embodiment thereof, which is provided by way of example and not by way of limitation, wherein.

Figure 1:
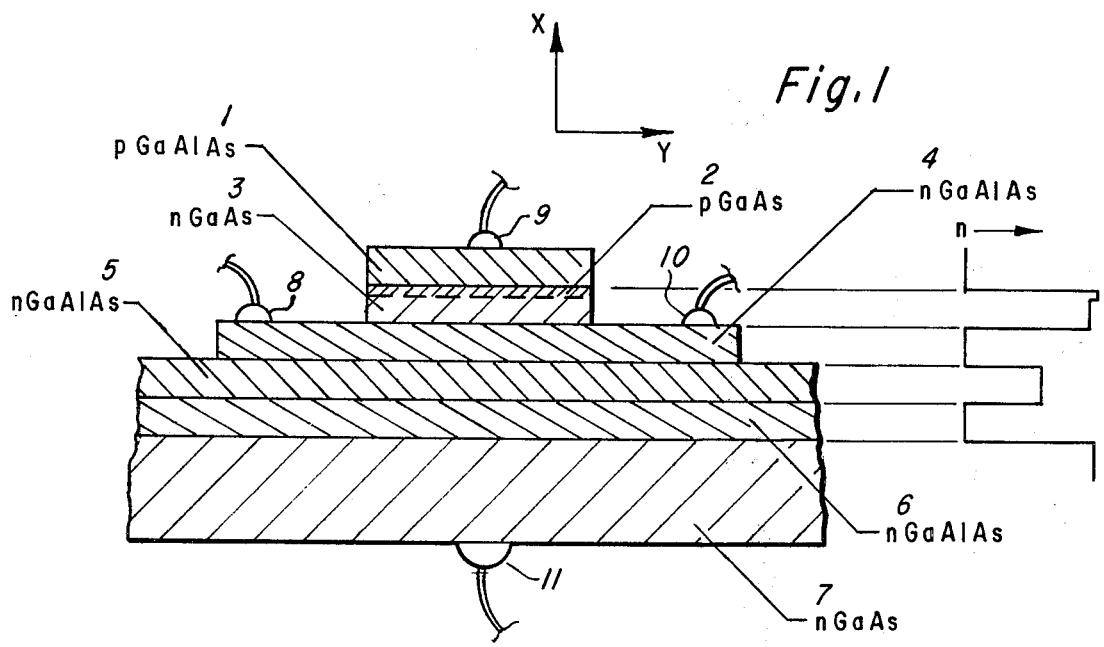
FIG. 1 is a cross-section of a large optical cavity (LOC) mesa laser coupled to a waveguide in accordance with the present invention.

Referring now to FIG. 1, there is shown a large optical cavity (LOC) mesa laser coupled to a waveguide. The p-n junction therein is represented by a dotted line between the layers 2 and 3. Layer 2 is formed of p-type gallium arsenide and layer 3 is formed of n-type gallium arsenide. Layers 2 and 3 form the laser cavity. Layer 5 is the waveguide and is of lower aluminum content than layers 4 and 6. As can be seen from the drawing, layers 4, 5, and 6 are all formed from n-type gallium aluminum arsenide, whereas the substrate 7 is formed of gallium arsenide of n-type. Layer 1 is of p-type gallium aluminum arsenide and provides a layer for attachment of contacts. The LOC structure is formed in the layers 1–4. The refractive indices of layers 2 and 3 are nearly equal and are considered as such. The laser cavity mirrors are parallel end facets of layers 1–4. Such parallel facets occur during epitaxial growth through a hole in a mask for certain substrate orientations. The layer 5 is the waveguide to which the laser of layers 1–4 is coupled. The coupled mesa structure shown in FIG. 1 allows layer 5 to be undoped, in order to decrease free carrier absorption loss. With regard to the contacts, the contacts are in the positions shown as 8, 9 and 10 or a second contact can be made to the gallium arsenide substrate opposite the contact 9 as indicated by contact 11 with contacts 8 and 10 omitted. This requires doping of the waveguide but perhaps the output could be coupled from layer 5 to a more transparent guide by evanescent fields after propagating in layer 5 for a short distance.

The structure is formed by providing an n-type gallium arsenide substrate 7 and then growing thereon the n-type gallium aluminum arsenide layers 6 and 5 by liquid phase epitaxy. Layer 5 has a lower aluminum to gallium ratio than layer 6 and n-type gallium aluminum arsenide layer 4 which is grown over layers 5 and 6. Layer 4 is formed by providing a silicon nitride or other type mask on layer 5 prior to the formation of the layer 4 with an aperture being formed in the shape of layer 4 in the nitride mask in a well known manner. Then the layer 4 of n-type gallium aluminum arsenide is deposited. The slice is then again masked with silicon nitride except in the region where layer 3 is to be formed and n-type gallium arsenide 3 and p-type gallium arsenide 2 are then formed through the hole in the mask in standard manner to provide the final structure. A further p-type gallium aluminum arsenide layer 1 can be formed above layer 2 to provide a material which is more receptive to bonding of a metal contact thereto.

The strength of coupling between the laser and the waveguide by evanescent fields across the layer 4 to the waveguide 5 is controlled by varying the thickness of layer 4. The waveguide is transparent to the gallium arsenide laser radiation because of the larger bandgap of the material of layer 5.

The layer 5 can have a different thickness under the mesa to avoid discontinuities in the waveguide properties at the mesa edge. It is advantageous to cover the end faces of the mesa of the cavity with a highly reflecting non-metallic coating to provide the necessary reflection of the light within the laser in the case of a transmitter where the laser is an oscillator. In the case of a repeater where the laser is an amplifier, the reflectivities of the end faces should be low on the other hand.

The parameters of the monolithic structure are determined mathematically as follows with reference first to FIG. 2.

Figure 2:
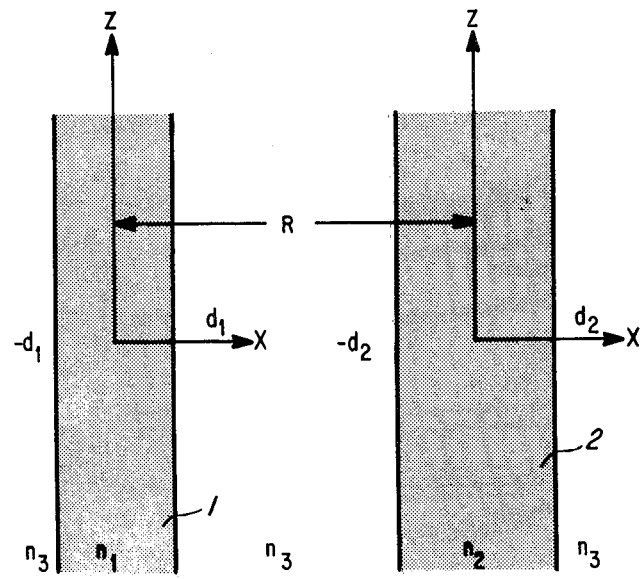
FIG. 2 is a schematic diagram of two slab waveguides of width $2d_1$ and $2d_2$ and refractive indices $n_1$ and $n_2$ embedded in a medium of index $n_3$.

FIG. 2 shows the idealization on which the following analysis is based. The two slab guides 1 and 2 represent the laser, layers 2 and 3, and the waveguide, layer 5, respectively of FIG. 1.

The electric field of a guided wave for the structure of FIG. 2 can be written approximately as $$E = A_1(z)E_1 + A_2(z)E_2.$$

(1)

$E_1$ is the unperturbed field in guide 1 — the field in the absence of guide 2. A similar statement applies to $E_2$. The fields $E_j$ are normalized to the same power P flowing in the $z$ direction per unit length in the $y$ direction, and the factor $A_j(z)$ represents the slow variation due to the coupling. Thus, the power in guide $j$ at $z$ is $p = |A_j(z)\exp(-i\beta_j a)|^2 P$. If $E_1$ is much smaller in guide 2 than $E_2$ and $E_2$ is much smaller in guide 1 than $E_1$, $A_1$ and $A_2$ obey the equations $$\frac{\delta A_1}{\delta z} = ic_1 A_2 \exp(i\beta_1 - i\beta_2)z$$

$$\frac{\delta A_2}{\delta z} = ic_2 A_1 \exp(-i\beta_1 + \beta_2)z$$

(2)

The $z$ dependence of the field $E_j$ is $\exp(-i\beta_j z)$ and $C_1$ and $C_2$ are coupling constants which depend upon the degree to which the unperturbed field of one guide extends into the other guide. Although each guide may have several modes, only those for which phase match ($\beta_1 = \beta_2$) occurs interact appreciably over distances $z$ of interest. For perfectly transparent media and for even TE mode - even TE mode coupling the constants are $$c_1 = c_2 = c = \frac{(n_g^2 - n_3^2)k_o \sqrt{n_1^2 - n_g^2} \sqrt{n_2^2 - n_g^2}}{n_g \sqrt{1+\gamma d_1} \sqrt{1+\gamma d_2} \sqrt{n_2^2 - n_3^2} \sqrt{n_1^2 - n_3^2}}$$

$$\exp[-\gamma(R - d_1 - d_2)],$$

$$\beta_1 = \beta_2 = \beta,$$

(3)

and for odd TE mode — odd TE mode coupling $C_1 = C_2 = -C$. $k_o$ is $2\pi/\lambda$, where $\lambda$ is the vacuum wavelength. $n_g$ is an effective index for the guided wave of velocity $v$ given by $\beta = (c/v)k_o = n_g k_o$. $\gamma$ is defined by $\gamma = k_o \sqrt{n_g^2 - n_3^2}$.

Suppose now that guide 1 is the cavity of a laser oscillator with perfectly reflecting end mirrors. This is the case of the transmitter $n_1$ and $\beta_1$ are complex. However $C_1$ and $C_2$ will still be given approximately by equation (3) with the real part of $n_1$ since the imaginary part of $n_1$ is much smaller than the real part. Taking the origin at the laser mirror on the left where $A_2(o) = 0$, and considering waves moving to the right in the $+z$ direction, we have as the solution of equations (2) in this case $$p_2(z)/p_1(o) = c_2^2 z^2.$$

(4)

$z$ must be small enough that the total power coupled out is not so great that oscillation ceases in the mode of interest.

Figure 3:
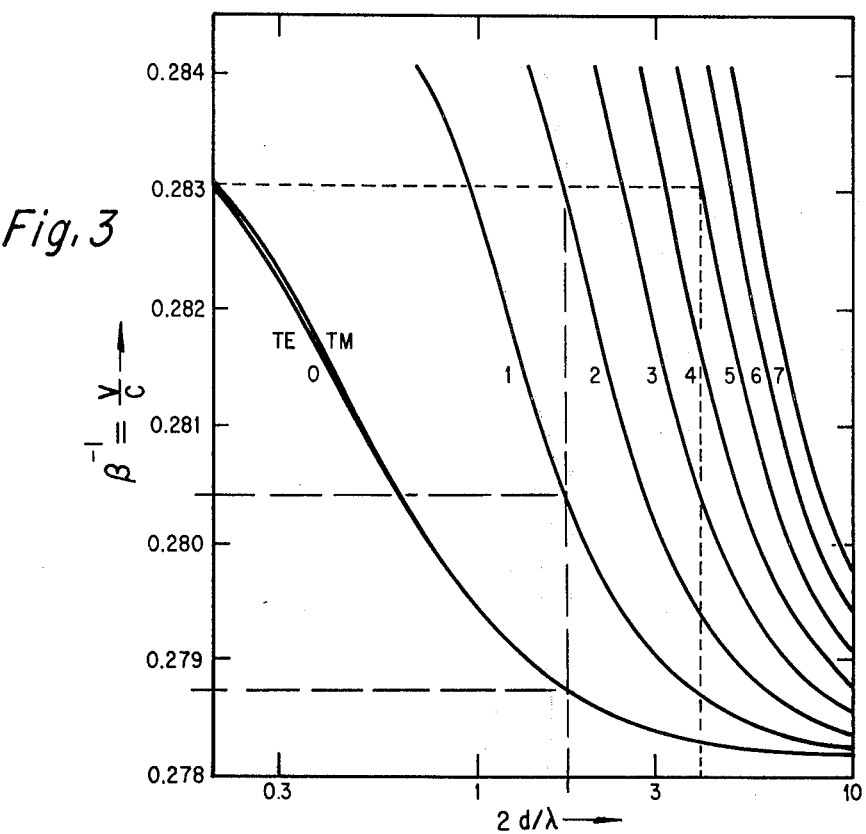
FIG. 3 is a dispersion curve for the first sixteen modes of a waveguide of index 3.595 bounded on both sides by a medium of index 3.52, the dashed line showing the operating point on TE5, TE and TM modes being coincident for mode numbers greater than zero.

Considering two diodes as models for the upper part of the structure of FIG. 1:

One diode No. 243 of Butler and Kressel, operates in the TE5 mode (the fundamental mode is here numbered 0) and has cavity width $2d_1 = 3.5$ μm, and $n_1 - n_3 = 0.075$. FIG. 3 shows dispersion curves for this cavity. From the figure $n_g = 3.533$, let $n_2 = 3.550$. This corresponds roughly to 6 percent Al if this layer is undoped. Layer 6, if undoped, has $n_3 = 3.520$ with about 10 percent Al content. Phase match wide mode TE3 of guide 2 is possible with $2d_2 = 4.49$ μm. When these values are used in the expression for $c$, the coupling constant, the only remaining unknown is R. In order to extract 5 percent of the laser power per pass in the $+z$ direction (10 percent total), R must be 5.60 μm for an interaction length $z - 300$ μm.

The second diode No. 241 of Butler and Kressel, with $2d_1 = 2.8$ μm and $n_1 - n_3 = 0.05$ operates in the TE2 mode. From curves similar to those of FIG. 3, one finds $n_g = 3.572$, and phase match with the TE0 mode of guide 2 occurs if $n_2 = 3.575$, $n_3 = 3.545$, and $2d_2 = 2.67$ μm. In a length of 300 μm the same fraction of power can be coupled out if R = 3.685 μm. In both cases the 10 percent coupling loss is small enough that oscillation will continue in the mode of interest.

If there is a small mismatch between modes $\delta = \beta_1 - \beta_2$, equation (4) becomes $$p_2(z)/p_1(o)^2 = [4(c_2')^2/\delta^2] \sin^2 z\delta/2. \quad (5)$$

A mismatch $\delta = 92$ cm$^{-1}$ will cause a 50 percent reduction in the power coupled out in the above two cases. $c_2'$ was written instead of $c_2$ to indicate a difference from the $c_2$ of equation (4) because of the mismatch. Actually $c_2' \approx c_2$ for this small value of $\delta$. If the mismatch is caused only by an error $\Delta d_2$ in the width of guide 2, the magnitude of the error is $$\Delta(d_2/\lambda) = |\Delta(d/\lambda)/\Delta\beta\delta|. \quad (6)$$

$|\Delta(d/\lambda)/\Delta\beta|$ is $1.0 \times 10^{-2}$ cm for the case of diode No. 241 and $2.6 \times 10^{-3}$ cm for diode No. 243, leading to values of $(\Delta d_2)/d_2$ of 30 percent and 5 percent respectively. This is an indication of the tolerances necessary in the device.

The structure of FIG. 1 could also be used to amplify a wave. This is the repeater. In this case feedback would be eliminated, perhaps by etching the end facets. Let $\beta_1 = \beta + ig$, $\beta_2 = \beta$, where g is the amplifier gain minus the losses (excluding the end losses). Equations (2) become $$\frac{\delta A_1}{\delta z} = ic_1 A_2 e^{-gz}$$
$$\frac{\delta A_2}{\delta z} = ic_2 A_1 e^{gz}. \quad (7)$$

Figure 4:
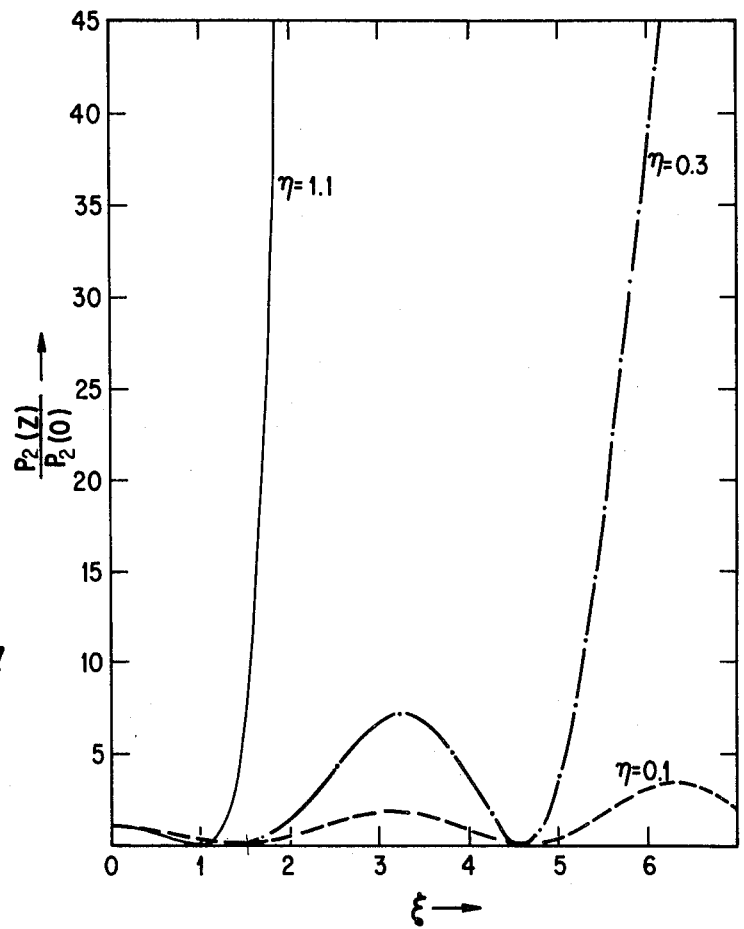
FIG. 4 is a curve of the normalized power in the second waveguide of FIG. 2 vs. distance for several values of m, the abscissa being $\xi = Z \sqrt{C_1 C_2}$ rather than Z. In this case guide 1 is a laser amplifier.

Although $\beta_1$ is complex, $\beta >> g$. $C_1$ and $C_2$ can again be approximated by their real parts. The solution in this case is shown in FIG. 4 for several values of the ratio $\eta = g/(2\sqrt{C_1 C_2})$.

Figure 5:
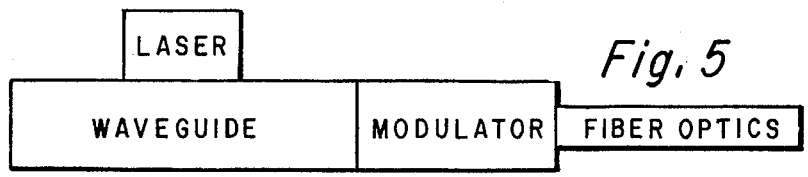
FIG. 5 is a diagram of a transmitter using the monolithic structure of the present invention.

Referring now to FIG. 5, there is shown a typical transmitter which can be fabricated using the monolithic structure of the present invention. The laser and waveguide are formed by the monolithic structure of FIG. 1 and provide a carrier signal of light frequency. This carrier is modulated by the modulator which can be formed in the same substrate as the laser and waveguide to provide the information on the carrier. The information carrying light frequency is then transmitted via fiber optic devices as shown, or by other means. In the case of the repeater the configuration is similar as described above. No modulator is required, of course, and the incoming signal to be amplified would be brought to the repeater by another fiber-optic line.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications. In particular, other configurations than the LOC structure may be used for the laser.

What is claimed is:

1. A monolithic semiconductor structure comprising:
    a semiconductor substrate,
    first and second layers of semiconductor material, said first layer of semiconductor material being disposed in intimate contact with the surface of said semiconductor substrate and said second layer of semiconductor material being disposed atop said first layer of semiconductor material in intimate contact therewith,
    a semiconductor laser mounted on said second layer of semiconductor material and including a base layer of semiconductor material disposed in intimate contact with said second layer of semiconductor material and third and fourth layers of semiconductor material of opposite conductivity types disposed on said base layer of semiconductor material, said third and fourth layers of semiconductor material defining a p-n junction therebetween and comprising the laser cavity of said semiconductor laser,
    said first and base layers of semiconductor material having substantially the same index of refraction and said second layer of semiconductor material sandwiched therebetween having a higher index of refraction relative to the index of refraction of said first and base layers of semiconductor material and comprising a semiconductor waveguide, and
    said semiconductor laser being optically coupled to said semiconductor waveguide by evanescent fields through said base layer for transferring radiation from said semiconductor laser into said semiconductor waveguide.

2. A monolithic semiconductor structure as set forth in claim 1, wherein said semiconductor laser is formed as a mesa on said semiconductor waveguide.

3. A monolithic semiconductor structure as set forth in claim 1, wherein said semiconductor substrate is formed of gallium arsenide, said first, second, and base layers of semiconductor material being formed of gallium aluminum arsenide, and said third and fourth layers of semiconductor material included in said semiconductor laser being formed of gallium arsenide of opposite conductivity types.

4. A monolithic semiconductor structure as set forth in claim 1, wherein said first, second, and base layers of semiconductor material are all of the same conductivity type.

5. A monolithic semiconductor structure comprising:
    a semiconductor substrate of n-type gallium arsenide,
    a first layer of n-type gallium aluminum arsenide disposed in intimate contact with said substrate,
    a second layer of n-type gallium aluminum arsenide disposed atop said first layer of n-type gallium aluminum arsenide in intimate contact therewith,
    a semiconductor laser mounted on said second layer of n-type gallium aluminum arsenide and including a base layer of n-type gallium aluminum arsenide in intimate contact with said second layer of n-type gallium aluminum arsenide, and a pair of laser cavity-defining layers of gallium arsenide of opposite conductivity types disposed on said base layer of n-type gallium aluminum arsenide with the n-type gallium arsenide laser cavity-defining layer in intimate contact with said base layer of n-type gallium aluminum arsenide and the p-type gallium arsenide laser cavity-defining layer being disposed in intimate contact with the opposite surface of said n-type gallium arsenide laser cavity-defining layer to define a p-n junction therewith, and a layer of p-type gallium aluminum arsenide disposed atop said p-type gallium arsenide laser cavity-defining layer, said second n-type gallium aluminum arsenide layer having a lower aluminum to gallium ratio than said first layer and said base layer of n-type gallium aluminum arsenide between which it is disposed, the index of refraction of said second layer of n-type gallium aluminum arsenide being higher than the indices of refraction of said first layer and said base layer of n-type gallium aluminum arsenide, said second n-type gallium aluminum arsenide layer serving as a semiconductor waveguide, and said semiconductor laser being optically coupled to said semiconductor waveguide by evanescent fields through said base layer of n-type gallium aluminum arsenide in intimate contact with said semiconductor waveguide for transferring radiation from said semiconductor laser into said semiconductor waveguide.

\* \* \* \* \*